United States Patent

Pierce

[15] 3,696,424

[45] Oct. 3, 1972

[54] METHOD AND APPARATUS FOR VERY-LOW-FREQUENCY RADIO NAGIGATION

[72] Inventor: John A. Pierce, Arlington, Mass.

[73] Assignee: LTV Electrosystems, Inc., Dallas, Tex.

[22] Filed: Dec. 23, 1968

[21] Appl. No.: 785,925

[52] U.S. Cl. .................................343/105 R, 325/65
[51] Int. Cl. ...............................................G01s 1/36
[58] Field of Search............343/105, 100 ST; 325/65

[56] References Cited

UNITED STATES PATENTS

| | | |
|---|---|---|
| 3,124,799 | 3/1964 | Hagedorn et al.....343/100 ST |
| 3,209,356 | 9/1965 | Smith ........................343/105 |
| 3,493,971 | 2/1970 | Earp...........................343/105 |
| 3,495,260 | 2/1970 | Laughlin et al........343/105 X |

OTHER PUBLICATIONS

J.A. Pierce; " Radux" , Cruft Lab., Harvard University, Cambridge, Mass. Tech. Rep. No. 17 (July 1947)

W. H. Guier & G. C. Weiffenbach; " A Satellite Doppler Navigation System" , Proceedings Vol. the IRE, Vol. 48, pp. 507– 516 (April 1960)

G. C. Weiffenbach; " Measurement of the Doppler Shift of Radio Transmission" , Proceedings of the IRE, Vol 48, pp. 750– 754 (April 1960)

*Primary Examiner*—Rodney D. Bennett, Jr.
*Assistant Examiner*—T. H. Tubbesing
*Attorney*—Robert G. Crooks, Tennes I. Erstad and Jefferson Ehrlich

[57] ABSTRACT

Disclosed is a method and apparatus for improving the accuracy of navigation by the Omega Navigation System. The improvement in the method of navigating by the Omega system relates to the detection of the phase of each of at least two very-low frequency signals and the generation therefrom of a composite signal which bears a predetermined relationship to the detected signals and the predetermined relationship is selected to reduce the positioning error attributable to diurnal variations and geophysical anomalies in the transmission times of the respective signals, and included is apparatus for practicing the method.

13 Claims, 9 Drawing Figures

PATENTED OCT 3 1972　　3,696,424

JOHN A. PIERCE
INVENTOR

BY Robert M. Sperry
ATTORNEY

FIG 2

FIG 4  TIMES OF ARRIVAL OF SIGNALS FROM HAWAII

FIG 5

DEVIATIONS OF THREE TIMES OF ARRIVAL OF SIGNALS FROM NORWAY WITH RESPECT TO THE NORMAL DIURNAL VALUES, FOR A FEW DAYS IN NOVEMBER, 1967, DURING A POLAR CAP ANOMALY

JOHN A. PIERCE
INVENTOR

BY Robert M. Sperry
ATTORNEY

INVENTOR.
JOHN A. PIERCE

METHOD AND APPARATUS FOR VERY-LOW-FREQUENCY RADIO NAGIGATION

This invention relates to radio navigation and is particularly directed to methods and apparatus for navigation by means of very-low-frequency (VLF) radio signals.

As the density of intercontinental transportation increases, the need for more precise navigation techniques also increases. Precise navigation is necessary to permit the navigator to select and follow the most direct route and to avoid collision with other ships or aircraft. Celestial navigation techniques have been employed for hundreds of years and permit a navigator to determine his position within about five miles. However, since these techniques require a clear view of several stars, celestial navigation techniques cannot be used when the sky is overcast. To overcome this problem, various navigation techniques have been proposed using radio frequency signals. Some of these techniques, such as radar, are quite accurate but require tremendous power to achieve significant range. Thus, typical airborne radar units have a range of only about 300 miles; and even the gigantic units of the Ballistic Missile Early Warning System have a range of only about 1,000 miles. Other radio navigation systems, such as VOR, are limited to line-of-sight ranges; while still others, such as ADF, are strongly effected by atmospheric disturbances. Quite recently, a very-low-frequency navigation system, called "Omega", has been introduced which overcomes many of these problems. The "Omega" Navigation System is described in a publication entitled "Omega, a World Wide Navigational System" dated May 1, 1966 (Defense Document Center No. Ad-630 900). Under the Omega system, it has been found that very-low-frequency radio signals can be reliably transmitted over many thousands of miles with relatively modest power requirements, and that the time of transmission of such signals is predictable with errors of only a few microseconds. Hence, by providing a network of four transmitting stations (soon to be expanded to eight) at widely-spaced locations about the earth, each carefully synchronized with the others and each transmitting several time-shared frequencies in predetermined sequence, a navigator, located anywhere in the world, can receive signals from several of these stations, and, by phase-analyzing the signals, can determine his position. Unfortunately, the signals of the Omega system are subject to significant diurnal variation in the velocity of propagation and the compensation for this, which is proportional to distance, ordinarily leaves residual errors of one to two miles in position. For instance, "Air/Surface Omega Navigation Charts" are published by the U. S. Naval Oceanographic Office, Washington, D. C. (a typical chart for the North Atlantic Ocean - Eastern United States is Chart No. V030-22). The chart indicates isophase lines with respect to each of the active Omega stations. When a navigator positions himself, as in a channel or lane between respective isophase lines, he knows that his distance from a respective transmitting station is some whole number of cycles or wave lengths of the frequency he is receiving plus some percentage of a cycle of the respective signal. By plotting the percentage of the cycle with respect to the lane boundaries, i.e., the isophase lines, the navigator places himself on a hyperbolic line which is parallel to the lane boundaries. By a similar plot with respect to a second station, a second hyperbolic line of position is obtained which intersects the first hyperbolic line, thus precisely pinpointing the location of the receiver. This means that a navigator needs only to identify with respect to a single frequency transmitted by a respective station, a percentage of one full cycle of a wave to determine his position with respect to the lane boundaries. The lane boundaries correspond to the wavelength of a full cycle of the wave of the respective frequency. It is apparent, therefore, that the transmission time of a wave can be stated in terms of phase. The period of a cycle of a 10 Kc/s wave is 100 microseconds. One centicycle is defined as 1/100 of a cycle, and for a 10 Kc/s wave one centicycle equals 1 microsecond. Since there is substantial noise in the spectrum at 10 Kc/s, a basic frequency of 10.2 Kc/s is used, and phase and transmission time readings are expressed in the Omega system in the unit of centicycles of 10.2 Kc/s.

The very-low-frequency waves transmitted by an Omega station are effectively contained in a waveguide which is bounded on one side by the earth and on the opposite side by the lower reaches of the ionosphere. Since the earth and ionosphere are substantially concentric, curved, parallel surfaces, the transmitted waves are reflected between the two surfaces as they travel through the wave guide. While the velocity of an electromagnetic wave transmitted in a vacuum is theoretically equal to the speed of light, regardless of the frequency, the effective velocity, that is the speed at which a wave travels from one point on the earth's surface to a second point, will vary from one frequency to the next. In its simplest terms, this phenomenon is explained by the fact that an electromagnetic wave of one frequency is not reflected by the ionosphere at the precise level that an electromagnetic wave of a second frequency is reflected, thus the path traveled by a wave of one frequency between successive points on the earth is longer than the path traveled by the wave of the other frequency.

Figure 3:
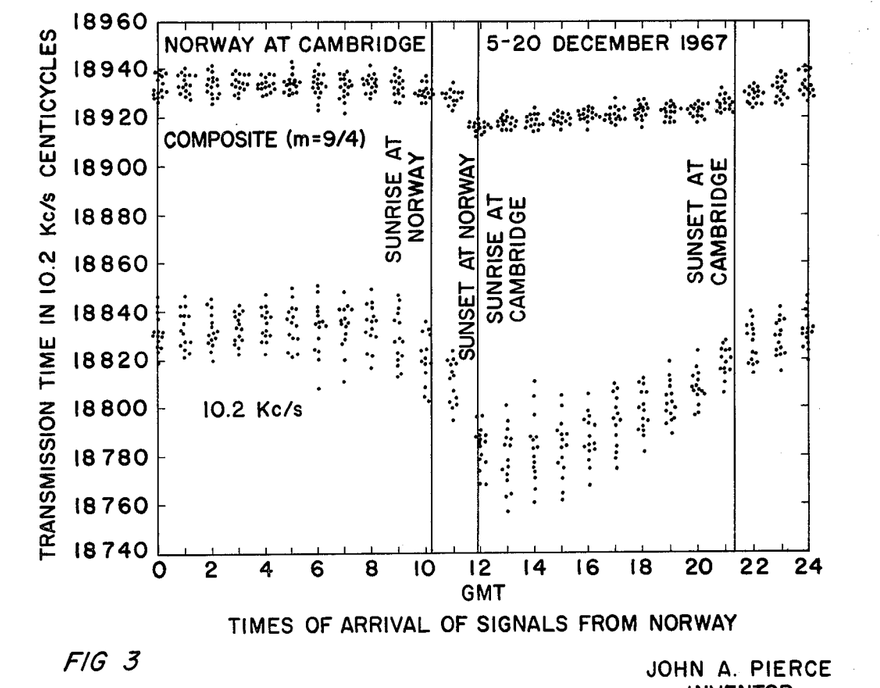
FIG. 3 is a graph showing times of arrival of one of the composite signals of the present invention and the 10.2 kc/s signal from the Norwegian Omega station.

It is also known that the height at which the ionosphere stands above the earth is greater at certain times than it is at other times. For instance, the ionosphere is lower at night, thus the travel time of an electromagnetic wave of a given frequency and between two points on the earth's surface is greater during the day than at night. For instance, the average plots of the transmission time of a 10.2 Kc/s signal, as shown in FIG. 3, vary in substantially the same manner each day, subject to the exceptions listed below.

Certain changes in the effective velocity between two points on the earth's surface occur in substantially the same manner each day. Changes in the height of the ionosphere between night and day are typical examples. These changes are called diurnal changes. Other, similar changes in the height of the ionosphere occur between seasons of the year. The diurnal changes and the seasonal changes described repeat so nearly exactly over the time periods set forth that their effect on the effective velocity of propagation is predictable, and tables are available for use by navigators whereby the readings made by the navigator are corrected for the effects of diurnal and seasonal changes by reference to a table which provides diurnal and seasonal correction factors. A typical table of this type is the "Omega Skywave Correction Table", U.S. Navy Oceanographic Office, Washington, D. C. The table identified as Publication N 224 (111-C) is for Station C (Hawaii) of the Omega System. Using the Omega system with corrections, a resolution of 1–2 miles is obtainable. Greater accuracy is still desired, however, and certain unpredictable geophysical anomalies occur which disrupt the transmission times of the VLF waves and can cause substantial errors in the navigator's readings. Sudden ionospheric disturbances and polar cap anomalies are two of the geophysical anomalies of the type described.

Figure 5:
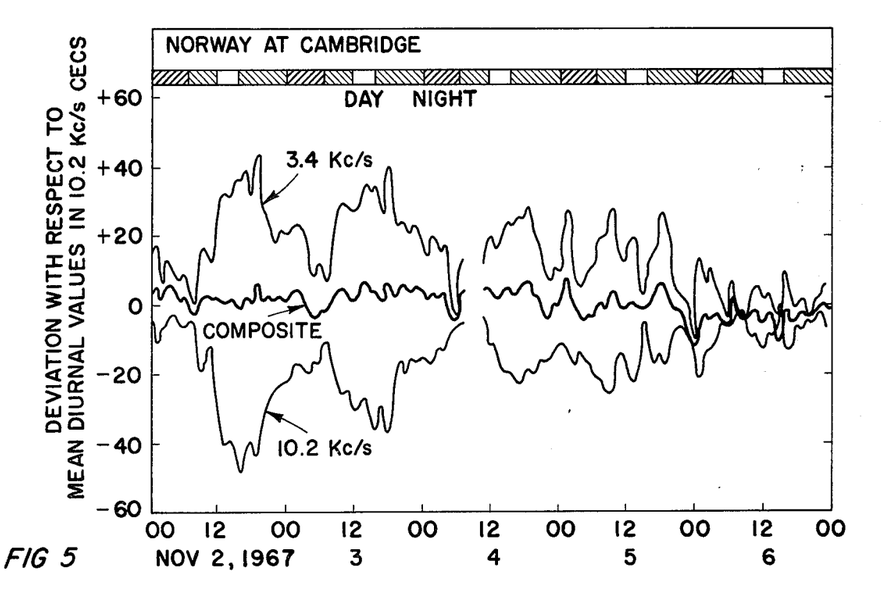
FIG. 5 is a graph showing deviations in the times of arrival of an Omega System signal caused by a long-term geophysical anomaly, together with a graph of a difference signal (3.4 Kc/s) and composite signals.

A polar cap anomaly occurs when energetic particles from the sun, mostly protons, are precipitated over the polar regions where they cause enhanced ionization. The enhanced level of ionization produces the same effect as lowering the level of the ionosphere, thus producing unpredictable changes in the effective velocity of a very low frequency wave. The polar cap anomaly is related, apparently, to sun flares and are generally thought of as being of fairly long duration, i.e., several hours to several days. FIG. 5 illustrates an example of a polar cap anomaly.

The second type of geophysical anomaly, the sudden ionospheric disturbance, is a similar occurrence, but may occur at any point in the ionosphere and not just positioned with respect to the polar caps. The sudden ionospheric disturbance again produces an enhancement of ionization in the ionosphere related, apparently, to sun activity, and this type of disturbance also acts to effectively reduce the level of the ionosphere in the location of the disturbance. Usually sudden ionospheric disturbances are of fairly short duration, i.e., 1 hour, and are believed to effect the geomagnetic lines of force about the earth. In any event, the sudden ionospheric disturbance causes additional, unpredictable changes in the effective velocity of electromagnetic waves between two points on the earth. An example of readings taken during a sudden ionospheric disturbance is curve 100 of FIG. 2.

Geophysical anomalies, therefore, act to alter the effective velocity and thus the phase of the signals received by a navigator, and the phase change will usually result in navigational errors of several miles, and the error may occur in readings taken over a span of several days.

These disadvantages of the prior art are substantially overcome with the present invention, and a novel navigation technique is provided which employs the signals of the Omega system to provide significantly more precise navigation than has been possible heretofore, while especially reducing the effects of sudden ionospheric disturbances and polar cap anomalies.

Alternatively, the present invention can be used to minimize or remove the necessity for making diurnal and annual corrections to the observed readings, as is necessary under the prior art. This version of the technique of the present invention offers only a small improvement in accuracy, but permits a great simplification in the use of Omega.

The advantages of the present invention are preferably attained by observing signals of at least two frequencies broadcast from each of at least three appropriate ones of the Omega transmitting stations in terms of a common local reference, processing said signals to derive a composite signal corresponding to each received station, and employing the composite signals to determine position.

Accordingly, it is an object of the present invention to provide an improved navigation technique.

Another object of the present invention is to provide an improved technique for navigation by means of very-low-frequency radio signals.

A further object of the present invention is to provide an improved technique for navigation by means of signals broadcast by Omega system transmitting stations.

An additional object of the present invention is to provide a technique for improving the accuracy and reliability of navigation by suitably processing signals broadcast by Omega system transmitting stations.

A specific object of the present invention is to provide a technique for navigation wherein signals of at least two frequencies are observed in terms of a common local reference for each of at least three appropriate ones of the Omega transmitting stations, the received signals are processed to derive a composite signal corresponding to each of the received Omega Transmitting stations, and the composite signals are employed to determine position.

An additional object of the present invention is to provide a technique for simplifying the operation of Omega navigation by removing the requirement for compensation of observed readings for variations in the velocity of propagation at various times of the day or year.

These and other objects and features of the present invention will be apparent from the following detailed description taken with reference to the figures of the accompanying drawing.

Figure 1:
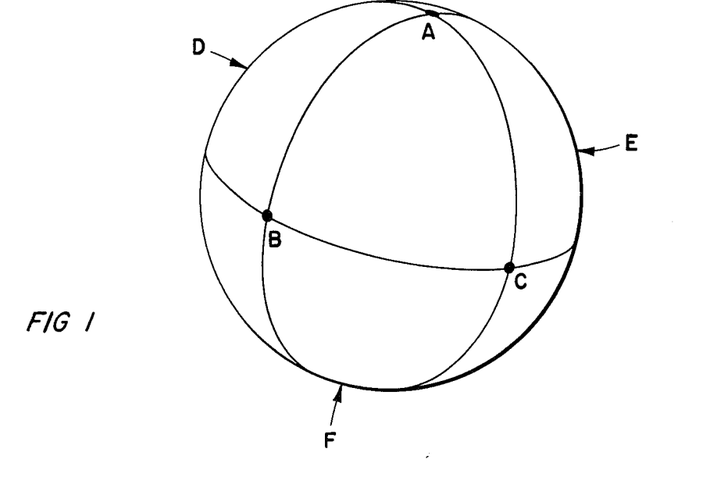
FIG. 1 is a diagrammatic representation showing the ideal distribution of Omega system transmitting stations about the world.

As seen in FIG. 1, the Omega navigation system calls for locating a plurality of very-low-frequency radio transmitting stations A, B, C, D, E, and F at widely-separated points about the world. At present, four such stations are in operation, located at Hawaii, New York, Norway and Trinidad, and a total of eight is planned. Each of these stations is carefully synchronized to Greenwich Mean Time, and each transmits continuous wave signals at 10.2 kc/s and 13.6 kc/s at specific times. Following the Omega technique, the navigator tracks the phases of the 10.2 kc/s signals from three or more of these stations to determine his position. If ambiguity is operationally serious, the navigator employs the 13.6 kc/s signals in a similar manner and compares his position as determined by the 13.6 kc/s signals, or as determined by a 3.4 kc/s difference signal that results from intercomparison of the 13.6 and 10.2 kc/s signals.

In accordance with the present invention, it has been found that the accuracy of position determination may be significantly increased. To accomplish this, the times of arrival of both signals from three or more Omega transmitting stations are observed with respect to a common, local reference and are employed to derive a composite signal having a transmission time which is preferably the mean of the average of the transmission times of the two Omega carrier-frequency signals and the transmission time of the difference frequency.

In the curved waveguide without lateral boundaries that is formed by the surface of the earth and the lower ionosphere, very-low-frequency electromagnetic waves may be considered to be propagated in a series of normal modes of vibration, of which one mode will be dominant over a larger distance. Several texts have been written, dealing specifically with this mode phenomenon. For instance, *Introduction to Theoretical Physics* by Leigh Page, published by Van Nostrand Co., New York; *Fields & Waves in Modern Radio* by Ramo-Whinnery, published by John Wiley & Sons, Inc., New York; *Electromagnetic Waves in Stratified Mediums* by James R. Wait, published by The National Bureau of Standards and distributed by MacMillan and Co., New York.

In Page, at 222, it is stated that the effective velocity of wave propagation of a single wave is defined as the phase velocity (Vp). If, however, dispersion exists in a medium through which waves are passing, that is, if the phase velocity is different for different wave lengths, then one of the two sets of waves travels faster than the other and reinforcement and interference take place as the first set gains on the second. The velocity with which the regions of reinforcement or interference advance is known as the group velocity (Vg). The text by Whinnery utilizes the phase (Vp) and group (Vg) velocity concept to develop a treatment of transverse magnetic waves between parallel planes. Mr. Whinnery, in his discussion at page 328, develops equations for group and phase velocities as follows:

$$Vp = \frac{\omega}{\beta} = \frac{v}{\sqrt{1-(fc/f)^2}}$$

$$Vg = d\omega/d\beta = V\sqrt{1-(fc/f)^2}$$

where
 $Vp$ = phase velocity in the waveguide
 $Vg$ = group velocity in the waveguide, and
 $V$ = the effective velocity of propagation of a wave in the medium contained in the waveguide.
 $f_c$ = cut off frequency
 $f$ = basic frequency
 $\omega$ = angular velocity or $2\pi f$, and
 gamma = $\alpha + j\beta$ = propagation constant It is easy to see then that $$Vp\, Vg = V^2 \qquad (1)$$

Since, in general $$T = d/v \qquad (2)$$

where
 $T$ = transmission time,
 $d$ = distance, and
 $v$ = effective velocity of propagation.

Thus, the reciprocal of equation (1) and be written:

$$T_o^2 = T_p T_g \qquad (3)$$

where
 $T_o = d/v_o$,
 $T_p = d/v_p$, and
 $T_g = d/v_g$.

At frequencies where the attenuation is low, $T_p$ and $T_g$ differ only slightly and we may say, without serious error, that $$T_o = (T_p = T_g/2) \qquad (4)$$

In the frequency region from $f_1$ to $f_2$, a satisfactory expression for the general phase velocity is the mean of the velocities at the two frequencies. ($f_1$ and $f_2$ are two respective VLF transmitted frequencies, for instance 10.2 Kc/s and 13.6 Kc/s.) This statement leads to the reciprocal relation $$T_p = (T_1 + T_2/2) \qquad (5)$$

where $T_1$ and $T_2$ are the transmission times at the lower and higher carrier frequencies, respectively.

The total phase shift along a transmission path at the difference frequence $(f_1 - f_2)$ is the difference between the two phase shifts at the carrier frequencies. That is, $$\phi_{2-1} = \phi_2 - \phi_1 \qquad (6)$$

where
 $\phi_{2-1}$ = total phase change along the transmission path at the difference frequency,
 $\phi_2$ = the same at the higher carrier frequency, and
 $\phi_1$ = the same at the lower carrier frequency.

For each phase shift $$\phi = (2\pi f d/v) = 2\pi f T \qquad (7)$$

where $f$ = frequency.

With these substitutions, Eq. (6) becomes $$T_{2-1} = \frac{f_2 T_2 - f_1 T_1}{f_2 - f_1} = \frac{d}{v_g} = T_g \qquad (8)$$

where
 $T_{2-1}$ = transmission time for the difference frequency,
 $f_1$ = the lower carrier frequency, and
 $f_2$ = the higher carrier frequency.

Inserting the values from Eq. (5) and Eq. (8) in Eq. (4), $$T_o = \frac{\frac{T_1+T_2}{2} + \frac{f_2 T_2 - f_1 T_1}{f_2 - f_1}}{2} \qquad (9)$$

which reduces to $$T_o = \frac{(3f_2 - f_1) T_2 - (3f_1 - f_2) T_1}{4(f_2 - f_1)} \quad (10)$$

If we define $$m_o = \frac{3f_2 - f_1}{4(f_2 - f_1)} \quad (11)$$

Eq. (10) reduces to $$T_o = T_1 + m(T_2 - T_1) \quad (12)$$

where $T_o$ = Transmission time of the composite signal
$T_1$ = Transmission time of the lower frequency signal (10.2 kc/s)
$T_2$ = Transmission time of the higher frequency signal (13.6 kc/s)

$m$ is a constant which may have any value but for optimum cancellation of propagational anomalies at the Omega frequencies of 13.6 kc/s ($f_2$) and 10.2 kc/s ($f_1$), $m_o$ is approximately equal to the ratio 9/4. (Where $m_o$ is the specific value of $m$ for the frequencies considered.)

Figure 8:
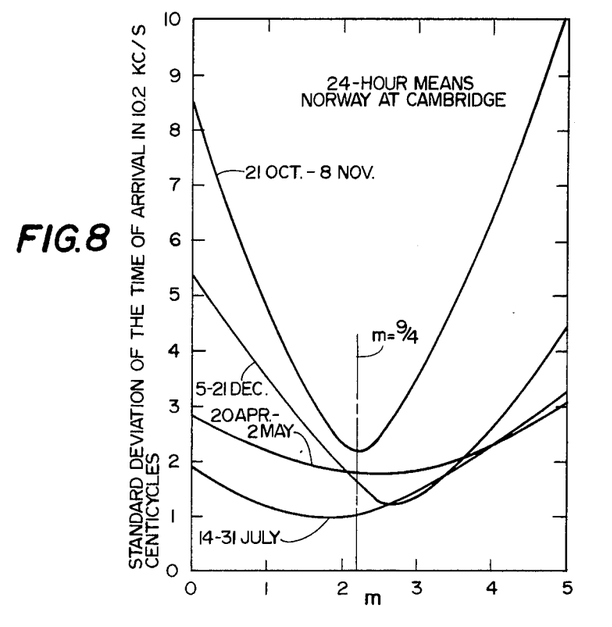
FIG. 8 is a graph of the standard deviation of the time of arrival at Cambridge of an Omega System signal from Norway at various times of the year.
Figure 9:
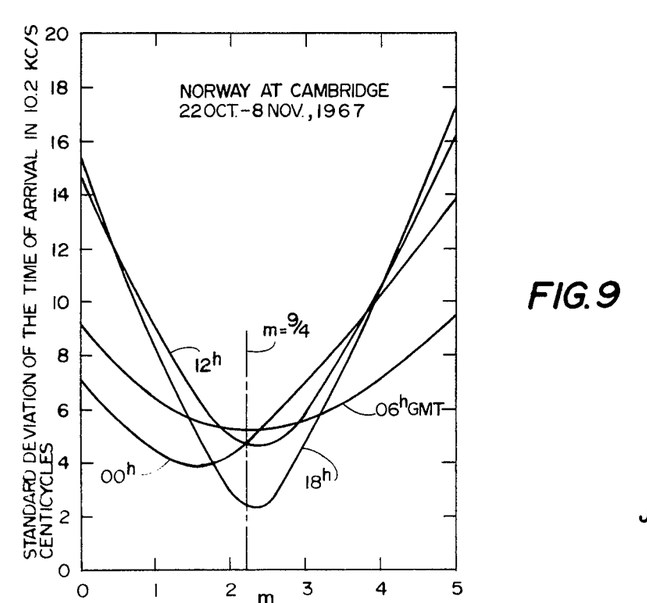
FIG. 9 is a graph similar to FIG. 8, but showing the standard deviation of the time of arrival in an Omega System signal at various times of the day.

The proper value for the ratio $m$ was determined originally by the correlation and analysis of experimental data. For instance, FIG. 8 shows the standard deviation of the time of arrival in 10.2 kc/s centicycles for signals received at Cambridge, Mass., from the Norwegian Omega station. In this figure, seasonal changes of the standard deviation time of arrival of an Omega signal are plotted with respect to alternative values of $m$. It is apparent that for values of $m$ lying in a range between 0 and 5, that the least amount of deviation occurs when $m = 9/4$. Similarly, in FIG. 9, the standard deviation of the arrival time of an Omega signal from the Norway station is plotted against m to reflect diurnal variations. Again, the least variation occurs when $m = 9/4$.

As previously stated, distance is equal to the transmission time multiplied by the effective velocity of propagation. Presumably, the effective velocity of propagation for the composite signal is nearly the velocity of light. However, it is not convenient to measure distances at the average height of the energy flow in a curved waveguide without lateral boundries, such as that formed by the surface of the earth and the lower ionosphere. Nevertheless, a close approximation to the velocity of propagation can be obtained from the expression $$c/v = 1 + (h/3a)$$

where $c$ = the velocity of light
$v$ = the velocity of propagation of the composite signal
$h$ = the height of the ionosphere layer
$a$ = the radius of the earth, 6,370 km.

Adopting the customary estimates of 70 km. and 90 km. for the daytime and night-time heights of the ionosphere layer at very-low-frequencies, we find the ratio of $c/v$ to be about 1.0037 for daytime and 1.0047 for night-time.

This residual diurnal variation can be reduced or removed by using a somewhat larger value of m than the value defined in Equation (11). This has the effect of increasing the transmission time of the composite signal slightly, and increasing it more by day than by night.

The optimum value of $m$ for cancellation of diurnal variation can be shown both theoretically and experimentally to be in the region near 3.25 or 3.5, for the Omega frequencies 10.2 and 13.6 kc/s. As stated above, increasing $m$ above the value of $m_o$ given by Equation (11) results in increased random variation because of imperfect cancellation of anomalies of propagation. The best value of $m$ for reduction of both diurnal and random variation is therefore somewhat less than the value 3.25 or 3.5 mentioned above. Experiments indicate that a value of 3.0 (for the frequencies 10.2 and 13.6 kc/s) gives approximately the best overall reduction of diurnal variation, because it reduces the diurnal effect to a small value without increasing random errors as much as would occur for exact compensation of diurnal variation.

This alternative technique for the use of composite signals offers the opportunity to navigate without the use of extensive tables of diurnal corrections, as has been required by the prior art. The resultant errors are not as small as they can be made by the use of the preferred value of m together with correction tables, but are as small or smaller than the errors under the techniques of the prior art, and the ease of operation is greatly increased with accompanying reduction in the opportunity for an operator to make mistakes.

To illustrate the cancellation of propagational anomalies, it has been reported that, during a sudden ionospheric disturbance, both the normal daytime variation of the transmission time and the average amplitude of the phase advance have magnitudes at 13.6 kc/s which are 0.56 ± 0.02 of the corresponding magnitudes at 10.2 kc/s. However, in Equation (12) with T indicating a change in T if $T_2$ is taken as 5 $T_1/9$, it will be seen that $T_o$ is zero. Hence, it is clear that one of the results of using the composite signal of the present invention is to substantially eliminate the effects of sudden ionospheric disturbances.

Figure 2:
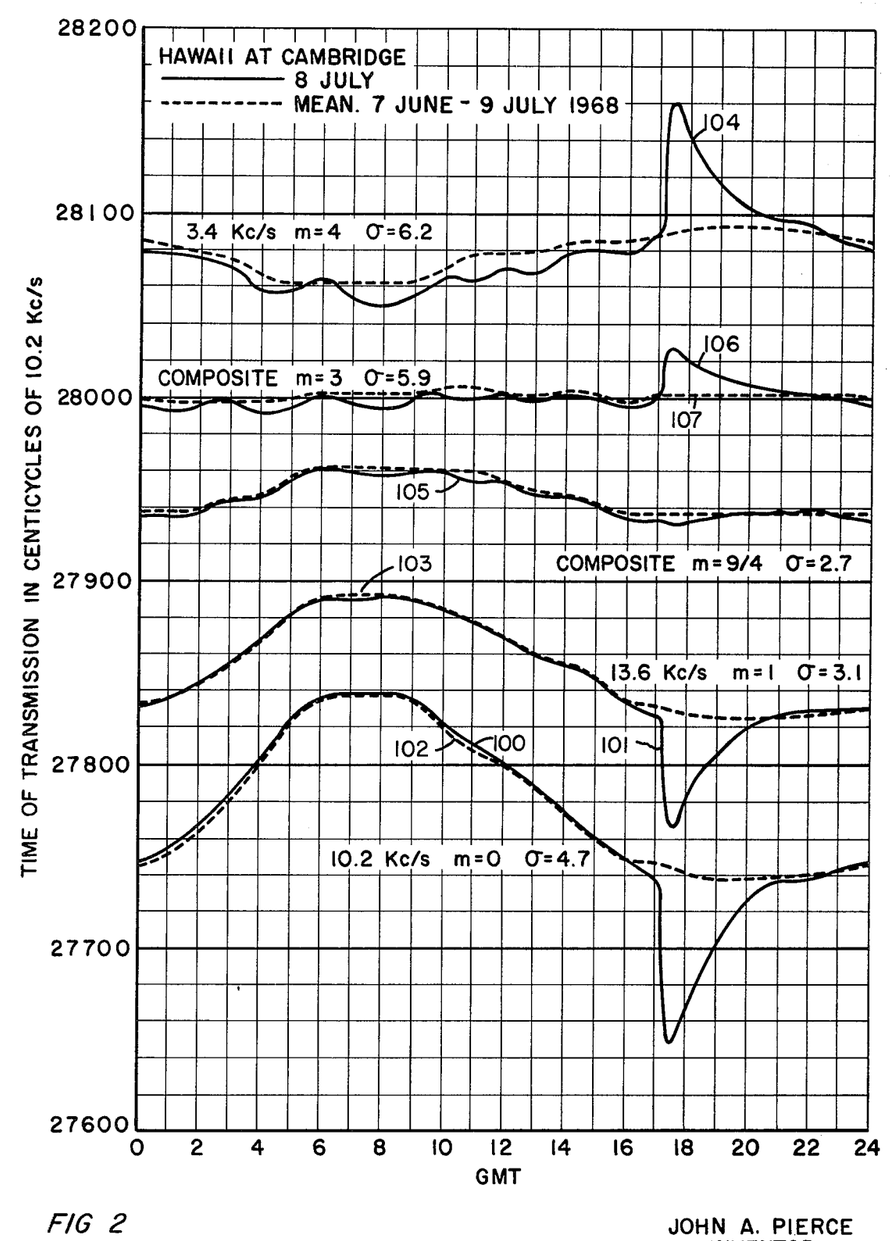
FIG. 2 is a series of graphs of the times of transmission of signals, including three of the composite signals of the present invention, from Hawaii to Massachusetts.

For example, FIG. 2 shows the variation in the time of arrival of a 10.2 kc/s signal, curve 100, and a 13.6 kc/s signal curve 101, from Hawaii, for alternate values of $m$. In curves 100 and 101 the solid lines are drawn through observed values on July 8, 1968; a day on which a major sudden ionospheric disturbance occurred at about $17^h 10^m$ GMT. The dotted curves 102, 103 are drawn through averages of the anticipated transmission times taken over an extended period. The sudden decrease in the time of arrival beginning at $17^h 10^m$ is similar at 13.6 kc/s and at 10.2 kc/s, but is smaller at 13.6 kc/s. At the difference frequency of 3.4 kc/s ($m = 4$), curve 104, the effect is reversed, and an increase in transmission time is shown at the time of the sudden ionospheric disturbance.

The composite signal, curve 105, with $m = 9/4$ shows almost no effect at the time of the sudden ionospheric disturbance. For this value of $m$ the overall agreement between the solid and the dotted lines is the best. There is, however, a residual diurnal variation.

Figure 4:
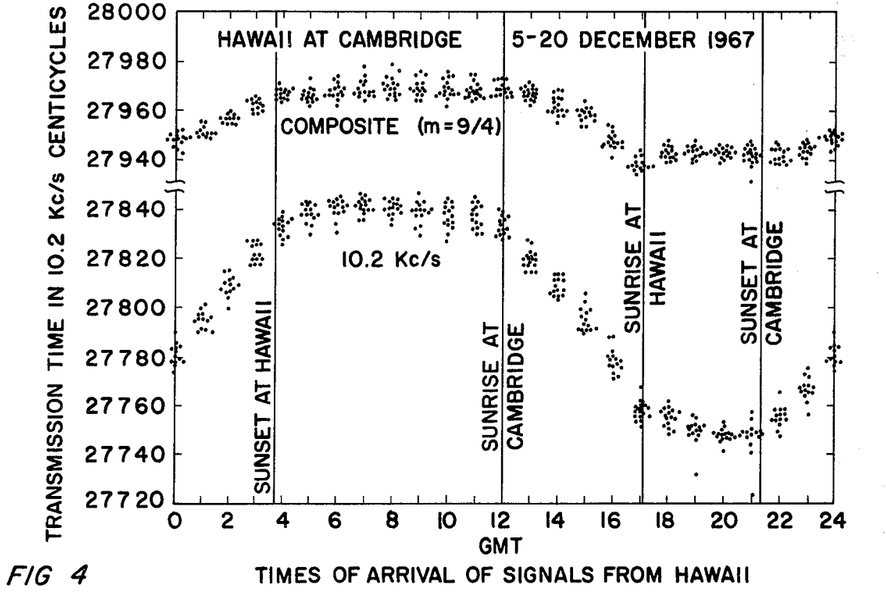
FIG. 4 is a graph showing times of arrival of one of the composite signals of the present invention and the 10.2 kc/s signal from the Hawaiian Omega station.

When $m = 3$, as in curve 106, these characteristics are reversed. The average dotted curve 107 shows very little diurnal variation, but the sudden ionospheric disturbance produces a delay in the transmission time, although one only about one-third as large as the effect at 10.2 kc/s. Similarly, as seen in FIG. 3 (for signals from the Norwegian Omega station) and FIG. 4 (for signals from the Hawaiian Omega station), the diurnal variation of the composite signal of the present invention is significantly smaller than for the 10.2 kc/s signal. FIG. 5 shows curves for the 3.4 kc/s Omega difference signal, the 10.2 kc/s Omega signal, and the composite signal of the present invention transmitted from the Norwegian Omega station and measured at Cambridge, Mass., during a polar cap anomaly of fairly large magnitude. It will be apparent, in FIG. 5, that the deviations of the 3.4 kc/s difference signal are a slightly reduced, mirror image of the deviations of the 10.2 kc/s signal, while the deviations of the composite signal of the present invention offer a great improvement in stability.

Figure 6:
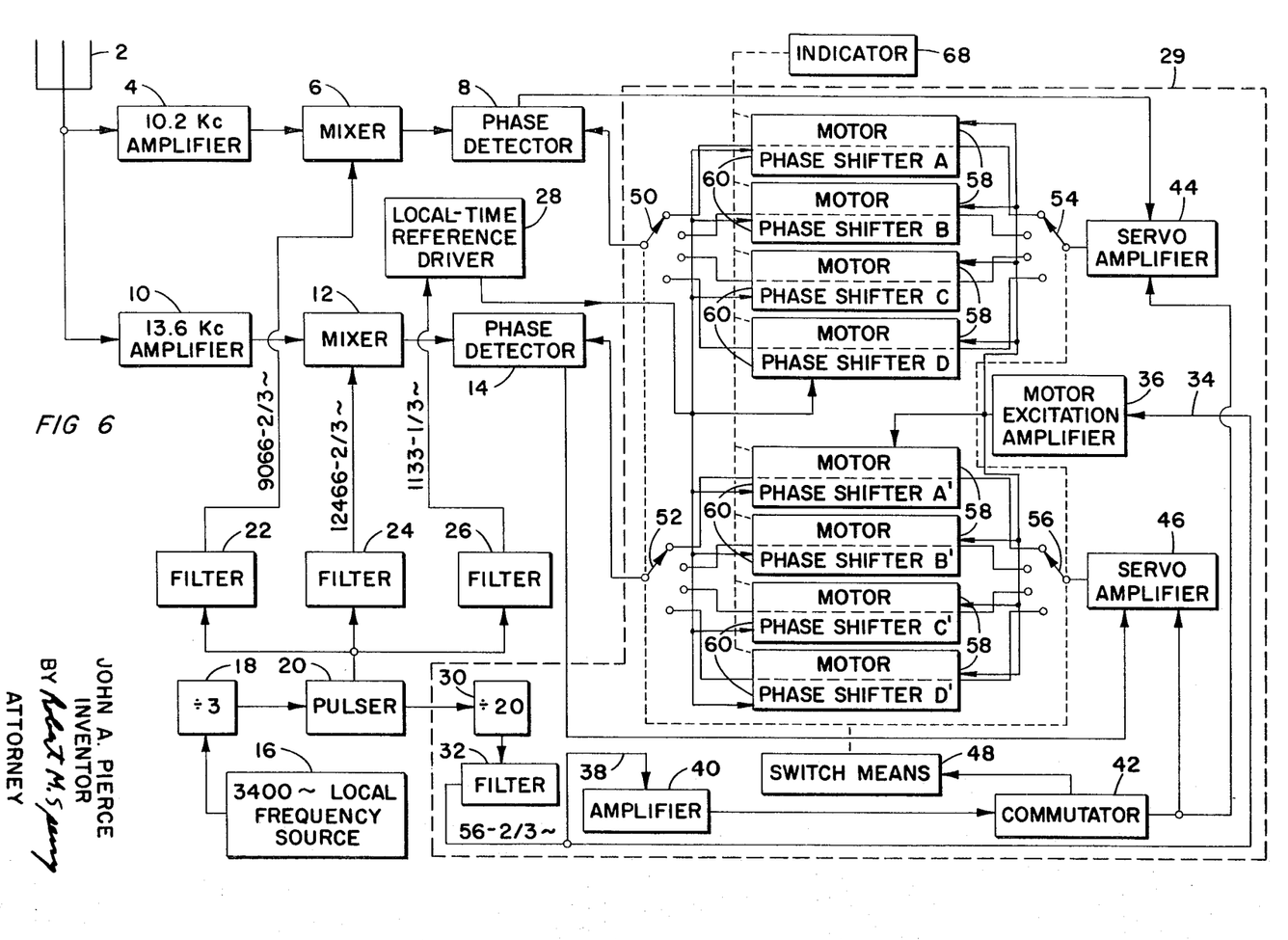
FIG. 6 is a diagrammatic representation of apparatus for performing the navigation method of the present invention.

In the form of the present invention chosen for purposes of illustration, FIG. 6 shows an antenna 2 positioned to receive the very-low-frequency radio signals broadcast by the Omega transmitting stations. As shown, an antenna 2 receives signals at a first frequency, such as 10.2 kc, transmitted from each of the transmitting stations in sequence. These signals are amplified by amplifier 4, and passed to mixer 6 and phase detector 8. Similarly, antenna 2 receives signals at a second frequency, such as 13.6 kc, transmitted from each of the transmitting stations in sequence, and these signals are amplifier by amplifier 10, and passed to mixer 12 and phase detector 14. A local, accurate-frequency source 16, generates a signal at 3,400 cycles-per-second which is passed through a suitable divider circuit 18 to drive a pulse circuit 20 yielding a pulse-type signal at a frequency of 1,133.33 cycles-per-second which is applied to filter circuits 22, 24, and 26. Filter 22 passes the eighth harmonic of the pulse-type signal, having a frequency of 9,066.66 cycles-per-second, to mixer 6. Similarly, filter 24 passes the eleventh harmonic of the pulse-type signal, having a frequency of 12,466.66 cycles per second, to mixer 12. Filter 26 removes the harmonics from the pulse-type signal and passes the 1,133.33 cycle-per-second signal to the local-time reference driver 28. The driver 28 is simply an amplifier which serves to provide sufficient power to drive the respective phase shifters 60, to which it is coupled. The signals from both phase detectors 8 and 14 and from local-time reference driver 28 are supplied to a suitable computer 29. The computer 29 pairs each of the signals from phase detector 8 with the corresponding signal from phase detector 14 so that the signals originating at each of the transmitting stations are paired. The computer 29 then processes each of the pairs of signals, in conjunction with the signal from the local-time reference driver 28, in the manner described above, and derives a plurality of signals, each having a value indicative of the distance to a respective one of the transmitting stations, which are supplied to indicator means 68 to provide a visual position indication for the navigator.

Figure 7:
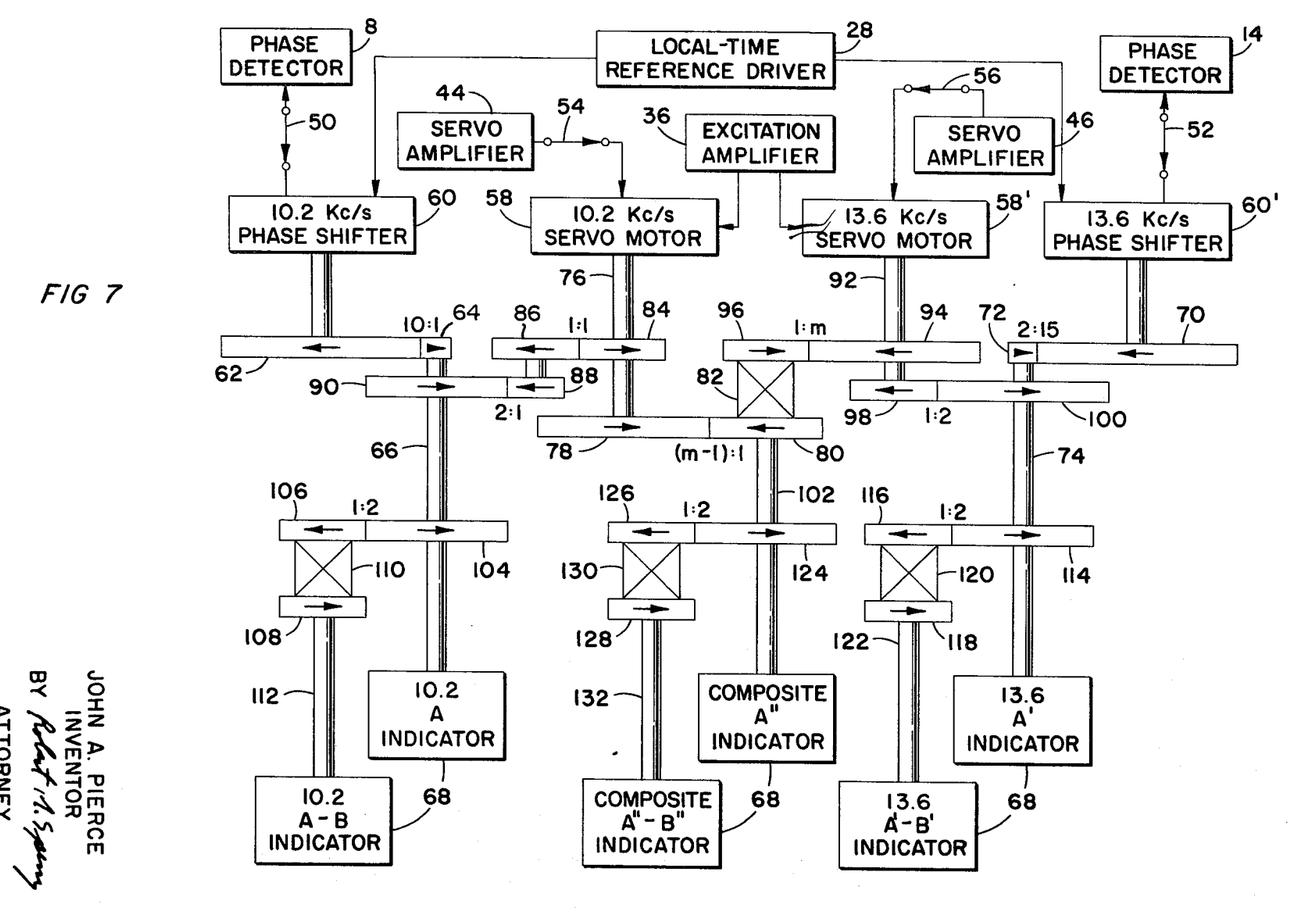
FIG. 7 is a diagrammatic representation of the computer of the apparatus of FIG. 6.

Obviously, numerous types of computers can perform the functions of computer 29. However, to insure sufficiency of disclosure, one such computer is disclosed in FIGS. 6 and 7. As shown, computer 29 is an electro-mechanical computer wherein the signals from pulse circuit 20 are also supplied to a second divider circuit 30 which yields a driving signal having a frequency of 56.66 cycles per second. The driving signal is passed through a suitable filter 32 and is applied, via conductor 34, to motor excitation amplifier 36 and, via conductor 38, to commutator amplifier 40 and, hence, to commutator 42. Commutator 42 supplies signals to energize servoamplifiers 44 and 46 and also supplies signals to switching means 48. For each transmitting station, a separate motor-phase-shifter unit, as shown in FIG. 7, is provided and each of these motor-phase-shifter units includes a respective portion for each of the frequencies to be received. For simplicity, four such motor-phase-shifter units have been represented in FIG. 6, each represented by a pair of blocks A and A', B and B', C and C', and D and D'. It will be seen that the unprimed blocks A, B, C, and D represent that portion of the respective motor-phase-shifter unit which responds to the 10.2 kc/s signal from the corresponding Omega transmitting station, while the primed blocks A', B', C', and D' represent that portion of the respective motor-phase-shifter unit which responds to the 13.6 kc/s signal from the corresponding Omega transmitting station. Switching means 48 serves to position switches 50, 52, 54, and 56 to apply the signals passed thereby to the appropriate one of the motor-phase-shifter units. Phase-shifter driver 28 is connected to all of the phase shifters, while motor-excitation amplifier 36 is connected to all of the motors.

All of the motor-phase-shifter units 58, 60 (FIG. 6) are identical. However, for simplicity, only motor phase shifter A-A' has been shown. As seen in FIG. 7, each motor-phase-shifter unit comprises two motors 58 and 58' and two phase shifters 60 and 60'. Motors 58 and 58' both receive excitation current from excitation amplifier 36. However, the speed of motor 58 is determined by the 10.2 kc/s signal from the respective Omega transmitting station A which is applied to motor 58 through servo amplifier 44 and switch 54. Phase-shifter driver 28 applies a local-time, reference signal to both phase shifters 60 and 60'; while a signal indicative of the phase of the 10.2 kc/s signal is applied from phase shifter 60 to phase detector 8 through switch 50, and a signal indicative of the phase of the 13.6 kc/s signal is applied from phase shifter 60' to phase detector 14 through switch 52. Since it is desirable to indicate the transmission time of each of the signals as a percentage of a period of the 10.2 kc/s signal, the input of phase shifter 60 is multiplied by 10 through gears 62 and 64 over the speed of the drive input shaft 66 of a suitable indicator 68 that indicates the arrival time of the 10.2 kc/s signal from Omega station A. Likewise, the input of phase shifter 60' is multiplied by 7½ through gears 70 and 72 above the speed of the drive input shaft 74 of indicator 68 that indicates the arrival time of the 13.6 kc/s signal from Omega station A. As has been previously shown the transmission time for the composite signal is equal to m times the transmission time at 13.6 kc/s minus (m-1) times the transmission time at 10.2 kc/s. To obtain this, motor 58 drives shaft 76 at a rate of 20 times the rate of 10.2 kc/s phase shifter 60 and applies this rotation through gears 78 and 80 to one input of differential 82. In addition, shaft 76 is coupled to shaft 66 through gears 84, 86, 88, and 90. At the same time, motor 58' drives shaft 92 at a rate of 20 times the rate of 10.2 kc/s phase shifter 60 and applies this rotation through gears 94 and 96 to the second input of differential 82. In addition, shaft 92 is coupled to shaft 74 through gears 98 and 100. Differential 82, then, drives input shaft 102 of indicator 68 to indicate the arrival time of the composite signal from Omega station A. If desired, input shaft 66 of the motor-phase-shifter unit for Omega station A may be coupled, through gears 104, 106, and 108 and differential 110, with the corresponding shaft of the motor-phase-shifter unit for Omega station B to cause input shaft 112 of indicator 68 to indicate the phase difference between the 10.2 kc/s signals from Omega stations A and B. Similarly, shaft 74 of the motor-phase-shifter unit for Omega station A can be coupled, through gears 114, 116, and 118 and differential 120, with the corresponding shaft of the motor-phase-shifter unit for Omega station B to cause input shaft 122 of indicator 68 to indicate the phase difference between the 13.6 kc/s signals from Omega stations A and B. Moreover, shaft 102 of the motor-phase-shifter unit in Omega station A can be coupled, through gears 124, 126, and 128 and differential 130, with the corresponding shaft of the motor-phase-shifter unit for Omega station B to cause input shaft 132 of indicator 68 to indicate the phase difference between the composite signals from Omega stations A and B.

In use, the apparatus of the present invention receives the 10.2 kc/s and 13.6 kc/s signals transmitted by each of the Omega transmitting stations and compares these signals with a local reference to provide an indication of the arrival time of each of these signals. In addition, the device of the present invention processes these signals to determine the arrival time of the composite signal. Since the velocity of propagation of each of these signals is substantially constant, the computer or the navigator can readily employ the data thus provided to determine the differences of the distances to the respective Omega stations and, hence, can determine the navigator's position quickly and accurately.

Although the examples cited herein have applied specifically to the frequency pair 10.2 and 13.6 kc/s, the method is clearly applicable to other pairs of frequencies, with suitable adjustment of the constant m, as shown in Equation (11) or by experiment.

Furthermore, if three or more frequencies are received from each transmitting station, three or more composite signals can be measured. It is then easy to provide means to present to the operator an average or a weighted average of these several results, with corresponding improvement in the accuracy and reliability of the final result. All such multiple comparisons are within the teachings of the present invention.

Obviously, numerous variations and modifications can be made without departing from the present invention. Accordingly, it should be clearly understood that the form of the present invention described above and shown in the accompanying drawing is illustrative only and is not intended to limit the scope of the invention.

What is claimed is:
1. A method of navigation comprising the steps of:
broadcasting time-shared radio signals at a plurality of known frequencies from each of a plurality of synchronized transmitters located at widely-separated positions about the earth;
establishing a local-time reference signal at a receiving station whose position is to be determined;
detecting the arrival at said receiving station of the signal at a first frequency from a first of said transmitters;
comparing the phase of said signal at said first frequency from said first transmitter with the local-time reference signal to determine the transmission time of said first frequency signal from said first transmitter to said receiving station;
detecting the arrival at said receiving station of the signal at a second frequency from said first transmitter;
comparing the phase of said signal at said second frequency from said first transmitter with the local-time reference signal to determine the transmission time of said signal at said second frequency from said first transmitter to said receiving station;
combining said signals at said first and second frequencies from said first transmitter to derive a first composite signal having a transmission time from said first transmitter to said receiving station defined by giving preselected weight, respectively, to the average of the transmission times of said signals from said first transmitter and the transmission time from said first transmitter of the difference frequency between said first and second frequencies;
detecting the arrival at said receiving station of the signal at said first frequency from a second of said transmitters;
comparing the phase of said signal at said first frequency from said second transmitter with the local-time reference signal to determine the transmission time of said first frequency signal from said second transmitter to said receiving station;
detecting the arrival at said receiving station of the signal at said second frequency from said second transmitter;
comparing the phase of said signal at said second frequency from said second transmitter with the local-time reference signal to determine the transmission time of said second frequency signal from said second transmitter to said receiving station;
combining said signals from said second transmitter to derive a second composite signal having a transmission time from said second transmitter to said receiving station defined by giving preselected weight, respectively, to the average of the transmission times of said signals from said second transmitter and the transmission time from said second transmitter of the difference frequency between said first and second frequencies;
detecting the arrival at said receiving station of the signal at said first frequency from a third of said transmitters;
comparing the phase of said signal at said first frequency from said third transmitter with the local-time reference signal to determine the transmission time of said first frequency signal from said third transmitter to said receiving station;
detecting the arrival at said receiving station of the signal at said second frequency from said third transmitter;
comparing the phase of said signal at said second frequency from said third transmitter with the local-time reference signal to determine the transmission time of said second frequency signal from said third transmitter to said receiving station;

combining said signals from said third transmitter to derive a third composite signal having a transmission time from said third transmitter to said receiving station defined by giving preselected weight, respectively, to the average of the transmission time of said signals from said third transmitter and the transmission time from said third transmitter of the difference frequency between said first and second frequencies; and plotting the position of said receiving station as a function of the transmission times and velocities of propagation of said composite signals.

2. The method of claim 1 wherein said plotting step comprises:

plotting the position of said receiving station with respect to said first transmitter as a function of the transmission time and velocity of propagation of said first composite signal;

plotting the position of said receiving station with respect to said second transmitter as a function of the transmission time and velocity of propagation of said second composite signal; and plotting the position of said receiving station with respect to said third transmitter as a function of the transmission time and velocity of propagation of said third composite signal.

3. The method of claim 1 wherein said plotting step comprises:

plotting a first position line as a function of the differences between the transmission times of said first and second complete signals; and plotting a second position line as a function of the differences between the transmission times of said second and third composite signals.

4. The method of claim 1 wherein said combining steps require that the signals at said first and second frequencies from the respective transmitters be combined according to the relationship $$T_o = T_1 + m(T_2 - T_1)$$

where
$T_c$ = transmission time of the composite signal
$T_1$ = transmission time of the lower frequency signal
$T_2$ = transmission time of the higher frequency signal
and $m$ is a constant having a value which is a function of said higher and lower frequencies.

5. The method of claim 4 wherein:

$$m = \frac{3f_2 - f_1}{4(f_2 - f_1)}$$

where $f_2$ = the higher frequency and $f_1$ = the lower frequency.

6. The method of claim wherein:
$m$ has a value in the range from 2.0 to 5.0.

7. The method of claim 1 wherein the velocity of propagation of the composite signals is determined by the relationship $$(c/v) = 1 + (h/3a)$$

where
$c$ = the velocity of light
$v$ = the velocity of propagation of the composite signal
$h$ = the height of the ionosphere layer
$a$ = the radius of the earth 8. The method of claim 1 wherein said first and second frequencies are very low radio frequencies.

9. The method of claim 1 wherein said first frequency is 10.2 kilocycles per second; and said second frequency is 13.6 kilocycles per second.

10. A method of navigation comprising the steps of:

broadcasting time-shared radio signals at a plurality of known frequencies from each of a plurality of carefully synchronized transmitters located at widely separated positions about the earth;

establishing an accurate, local-time reference signal at a receiving station whose position is to be determined;

detecting the arrival at said receiving station of the signal at a first frequency from a first of said transmitters;

comparing the phase of said signal at said first frequency from said first transmitter with the local-time reference signal to determine the transmission time of said first frequency signal from said first transmitter to said receiving station;

detecting the arrival at said receiving station of the signal at a second frequency from said first transmitter;

comparing the phase of said signal at said second frequency from said first transmitter with the local-time reference signal to determine the transmission time of said signal at said second frequency from said first transmitter to said receiving station;

combining said signals at said first and second frequencies from said first transmitter to derive a first composite signal having a transmission time from said first transmitter to said receiving station defined by giving preselected weight, respectively, to the average of the transmission times of said signals from said first transmitter and the transmission time from said first transmitter of the difference frequency between said first and second frequencies;

detecting the arrival at said receiving station of the signal at said first frequency from a second of said transmitters;

comparing the phase of said signal at said first frequency from said second transmitter with the local-time reference signal to determine the second transmission time of said first frequency signal from said second transmitter to said receiving station;

detecting the arrival at said receiving station of the signal at said second frequency from said second transmitter;

comparing the phase of said signal at said second frequency from said second transmitter with the local-time reference signal to determine the transmission time of said second frequency signal from said second transmitter to said receiving station;

combining said signals from said second transmitter to derive a second composite signal having a transmission time from said second transmitter to said receiving station defined by giving preselected weight, respectively, to the average of the transmission times of said signals from said second transmitter and the transmission time from said second transmitter of the difference frequency between said first and second frequencies; and plotting the position of said receiving station as a function of the transmission times and velocities of propagation of said composite signals.

11. A method of navigation from broadcasted time-shared radio signals at a plurality of known frequencies from each of a plurality of synchronized transmitters located at separated positions about the earth, comprising the steps of:

detecting the arrival of a first signal at a first frequency from a first of said transmitters at a receiving station whose position is to be determined;

comparing the phase of the first signal with a local-time reference signal to determine the transmission time of the first frequency signal from said first transmitter to the receiving station,     detecting the arrival of a second signal at a second frequency from said first transmitter at the receiving station;

comparing the phase of the second signal with the local-time reference signal to determine the transmission time of the second frequency signal from said first transmitter to the receiving station;

combining the first and second signals to derive a first composite signal having a transmission time from said first transmitter to the receiving station defined by giving preselected weight, respectively, to the average of the transmission times of the first and second signals from said first transmitter and the transmission time from said first transmitter of the difference frequency between the first and second frequency signals;

detecting the arrival of a third signal at the first frequency from a second of said transmitters at the receiving station;

comparing the phase of the third signal with the local-time reference signal to determine the transmission time of the first frequency signal from said second transmitter to the receiving station;

detecting the arrival of a fourth signal at the second frequency from said second transmitter at the receiving station;

comparing the phase of the fourth signal with the local-time reference signal to determine the transmission time of the second frequency signal from said second transmitter to the receiving station;

combining the third and fourth signals to derive a second composite signal having a transmission time from said second transmitter to the receiving station defined by giving preselected weight, respectively, to the average of transmission times of the third and fourth signals from said second transmitter and the transmission time from said second transmitter of the difference frequency between the third and fourth signals; and     generating the position of the receiving station as a function of the transmission times and the velocities of propagation of said composite signals.

12. Apparatus for radio navigation with a plurality of synchronized transmitters located at widely-separated positions about the earth each broadcasting time-shared radio signals at a plurality of known frequencies, the combination comprising:

antenna means located at a receiving station whose position is to be determined for detecting the signals broadcast by said transmitters;

time reference means establishing a local-time reference signal;

phase-comprising means connected to said antenna and said time reference means for comparing the phase of signals detected by said antenna with said local-time reference signal to determine the transmission times of the respective signals detected by said antenna from the corresponding one of said transmitters;

computer means connected to receive the output of said phase-comparing means and operative to combine the signals at first and second frequencies from each respective transmitter to derive a composite signal for each respective transmitter having a transmission time from the respective transmitter to said receiving station defined by giving preselected weight, respectively, to the average of the transmission times of the signals at said first and second frequencies from said respective transmitter and the transmission time from said respective transmitter of the difference frequency between said first and second frequencies; and     display means for providing a visual indication of said transmission times.

13. Apparatus for radio navigation by use of a plurality of synchronized transmitters located at separated positions about the earth each broadcasting time-shared radio signals at a plurality of known frequencies, the combination which comprises:

means for detecting the arrival of a first signal at a first frequency from a first of said transmitters at a receiving station whose position is to be determined;

means for comparing the phase of the first signal with a local-time reference signal to determine the transmission time of the first signal from said first transmitter to the receiving station;

means for detecting the arrival of a second signal at a second frequency from said first transmitter at the receiving station;

means for comparing the phase of the second signal with the local-time reference signal to determine the transmission time of the second signal from said first transmitter to the receiving station;

means for combining the first and second signals to derive a first composite signal having a transmission time from said first transmitter to the receiving station defined by giving preselected weight, respectively, to the average of the transmission times of the first and second signals from said first transmitter and the transmission time from said first transmitter of the difference frequency between the first and second signals;

means for detecting the arrival of a third signal at the first frequency from a second of said transmitters at the receiving station;

means for comparing the phase of the third signal with the local-time reference signal to determine the transmission time of the third signal from said second transmitter to the receiving station;

means for detecting the arrival of a fourth signal at the second frequency from said second transmitter at the receiving station;

means for comparing the phase of the fourth signal with the local-time reference signal to determine the transmission time of the fourth signal from said second transmitter to the receiving station;

means for combining the third and fourth signals to derive a second composite signal having a transmission time from said second transmitter to the receiving station defined by giving preselected weight, respectively, to the average of the transmission time signals of the frequency signals from said second transmitter and the transmission time from said second transmitter of the difference frequency between third and fourth signals; and display means for providing a visual indication of said first and second composite signals from which the position of the receiving station as a function of the transmission times and velocities of propagation can be calculated from said composite signals.

* * * * *

UNITED STATES PATENT OFFICE
CERTIFICATE OF CORRECTION

Patent No. __3,696,424__     Dated __October 3, 1972__

Inventor(s) __JOHN A. PIERCE__

It is certified that error appears in the above-identified patent and that said Letters Patent are hereby corrected as shown below:

On the cover sheet the name of the Assignee should read -- American Standard Inc., a corporation of Delaware --.

Column 13, line 32, after "second", cancel "complete", and insert -- composite --; column 16, line 1, "phase-comprising" should read -- phase-comparing --.

Signed and sealed this 1st day of May 1973.

(SEAL)
Attest:

EDWARD M. FLETCHER, JR.            ROBERT GOTTSCHALK
Attesting Officer                  Commissioner of Patents